T. J. MURPHY.
RECTIFIER OF ELECTRIC CURRENTS.
APPLICATION FILED JULY 24, 1908.

1,093,717.

Patented Apr. 21, 1914.
5 SHEETS—SHEET 1.

T. J. MURPHY.
RECTIFIER OF ELECTRIC CURRENTS.
APPLICATION FILED JULY 24, 1908.

1,093,717.

Patented Apr. 21, 1914.
5 SHEETS—SHEET 2.

T. J. MURPHY.
RECTIFIER OF ELECTRIC CURRENTS.
APPLICATION FILED JULY 24, 1908.

1,093,717.

Patented Apr. 21, 1914.

Witnesses:
Edward Rowland
M. A. Butler

Thomas J. Murphy, Inventor
By his Attorney

T. J. MURPHY.
RECTIFIER OF ELECTRIC CURRENTS.
APPLICATION FILED JULY 24, 1908.

1,093,717.

Patented Apr. 21, 1914.
5 SHEETS—SHEET 4.

Witnesses:
Edward C. Rowland
M. A. Butler

Inventor
Thomas J. Murphy
By his Attorney
F. F. Crampton

UNITED STATES PATENT OFFICE.

THOMAS J. MURPHY, OF ROCHESTER, NEW YORK.

RECTIFIER OF ELECTRIC CURRENTS.

1,093,717. Specification of Letters Patent. Patented Apr. 21, 1914.

Application filed July 24, 1908. Serial No. 445,102.

*To all whom it may concern:*

Be it known that I, THOMAS J. MURPHY, a subject of the King of Great Britain, and a resident of the city of Rochester, State of New York, have invented a new and useful Improvement in Rectifiers of Electric Currents, of which the following is a specification.

My invention relates to the rectification of electric currents.

It more particularly relates to the mechanism and the system whereby alternating electric currents are transformed or changed into direct currents.

It also relates to the means for causing variable currents to be changed or transformed into substantially constant currents.

The constructions containing the invention may be varied by those skilled in the art to which the invention pertains according to the uses or objects to be attained. In one form of construction, a resistance in a circuit is cut out, short circuit or reduced. I preferably accomplish this by means of an arc formed between the electrodes. The arc between electrodes is started at a certain point in the potential wave of the current to be rectified and at a point such that the potential of the current thereafter will be sufficient to sustain the arc for an interval of time and while the current passes over the arc. In the case of alternating currents the arc may be started at any time while the potential is sufficient to maintain the arc during the remainder of the wave or for an interval of time. The arc may again be started at the same corresponding point when the potential is of opposite sign. If both positive and negative parts of the wave are used the current is permitted to flow in a part of the circuit in the same direction whether the potential is either positive or negative. In one form of mechanism embodying my invention when alternating currents are rectified I use a device which operates synchronously with the current. The synchronously operating device permits the formation of an arc across the electrodes at the desired point in the variation of the main line current. In the preferred form of the invention, the synchronously operating device will cause a portion of the current under high pressure to pass across the electrodes at the required point. I have also provided a means for causing the arc to discontinue as soon as it reaches a potential below a certain amount to prevent a counter flow of current.

The invention in its greater or less scope or aspect may be embodied in many constructions different in form and arrangement.

The invention consists in features and equivalents and modifications thereof that appear in the following description or that may be disclosed in the drawings forming a part hereof and that may be suggested by the description and the drawings and that are included in or covered by the claims. I have merely shown some forms of construction containing the invention to show the operativeness of such structures.

Referring to the drawings

Figures 1, 2, 3:
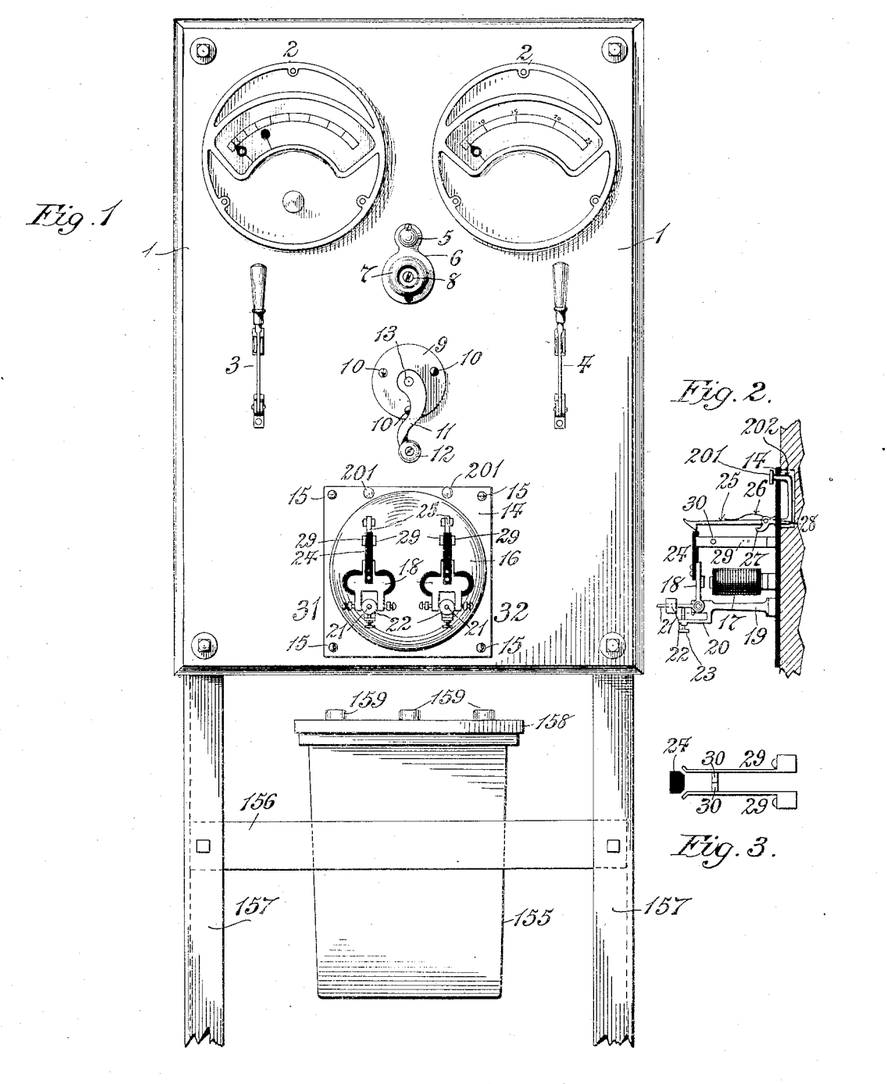
Figure 1 illustrates a front view of the panel supporting parts of the mechanism.
Fig. 2 illustrates a side view of one of the devices mounted on the front of the panel.
Fig. 3 illustrates a detail view of part of the said device.
Figures 4, 5:
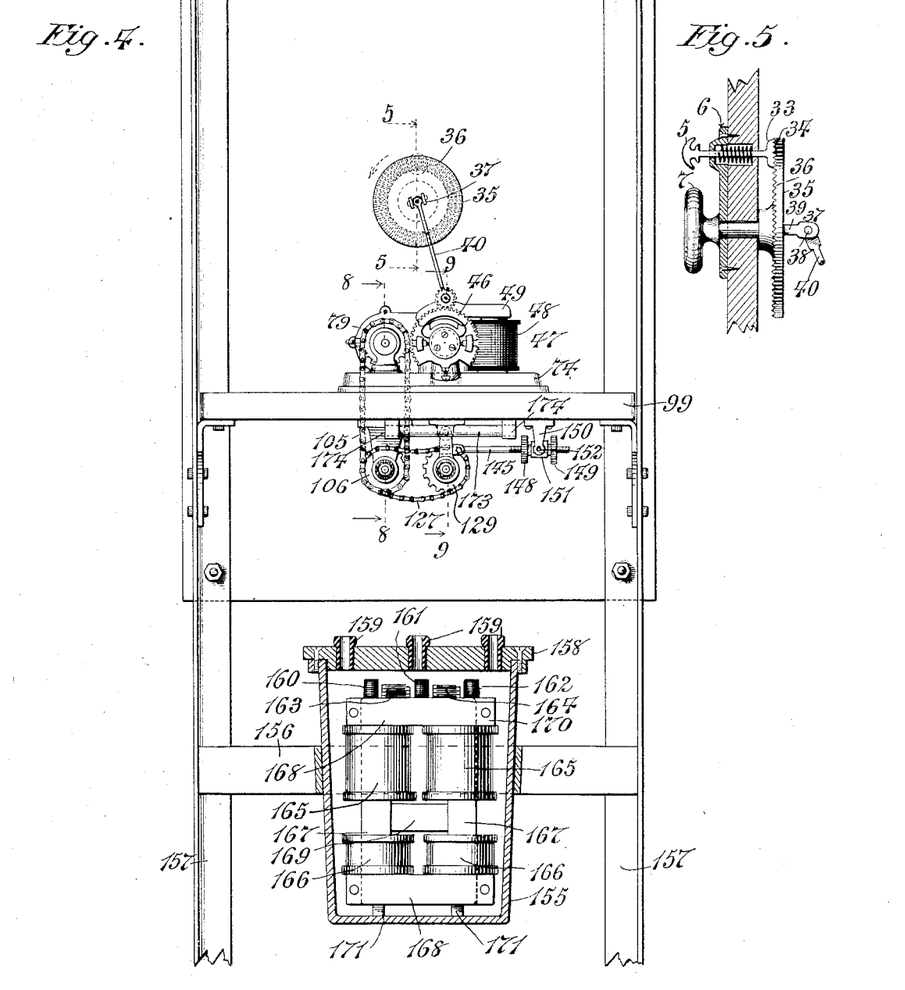
Fig. 4 illustrates a rear view of the panel, parts of the mechanism being removed for clearness.
Fig. 5 illustrates a detail.

Referring to Fig. 1, 1 is a panel plate which constitutes a base on which some of the mechanism is supported. It is made of slate or stone or other suitable insulating material. 2, 2 are electric measuring devices. 3, 4 are switches for connecting in the motor and other parts of the circuit, as hereinafter described.

Referring to the Figs. 1, 5 and 9, 7 is a knob supported on a rod 39 movable in plate 6 and secured by a screw 8. A disk 35 having radial teeth 36 is also secured to the shaft 39. A spring actuated knob 5 is adapted to secure rod 39 in any predetermined position to which it may be turned. The knob 5 is connected to a rod to which is attached a foot 33. The foot 33 is provided with teeth 34 which register with the radial teeth 36. The rod 39 terminates in a yoke 37 having a universal joint cross pin 38 to which rod 40 is connected. The rod 40 is connected to pin 41 and a wheel 42 by means of a universal joint 44. The pin 41 is rotatively mounted in the casing 45 and carries the pinion 42. The pinion 42 operates upon the segment of a wheel 46 and is adapted to adjust a controlling device so that a reduction of a resistance in a circuit will be produced at the desired points in the main line current wave. A means for starting the synchronously operating device is also located on the panel. 9 is a face plate secured by screws 10 to the panel. A crank 11 is located in front of the plate. It is provided with a knob 12 and a shaft 13. The crank may be turned to bring a synchronous motor up to the rate of alternations of the current to be rectified. A face plate 14 is also attached to the panel by means of the screws 15. A glass dome 16 is secured by the plate for covering a pair of electro-magnetic devices 31, 32. They control the current by means of switches which they open. 17 are the actuating magnets. The armatures 18 are supported on standards 19. To the standards are attached right angular arms 20 which extend out under threaded rods 21 which are attached to the armatures. The rods are provided with weights 22 which cause the return movement of the armatures, which is limited by the adjustable screws 23. A block 24 of insulating material is secured to each armature. The block is caught by a hook 25 controlled by a spring 26 and stop 27. They are supported on a standard 28. The block 24 is adapted to spread contacts having the platinum points 30 whereby the circuit is broken when the spring contacts are separated. After the operation of the magnets the armatures are released by pressing the buttons 201, which operate upon the latches 25 through the arms 202.

Figures 6, 11:
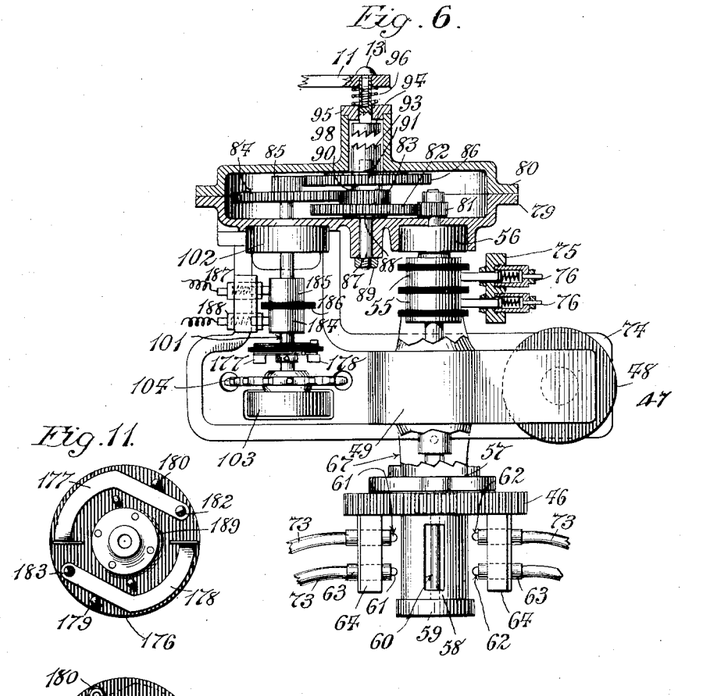
Fig. 6 is a top view of the mechanism.
Figs. 11 and 12 show the front and rear views of an automatic switch.
Figures 7, 12:
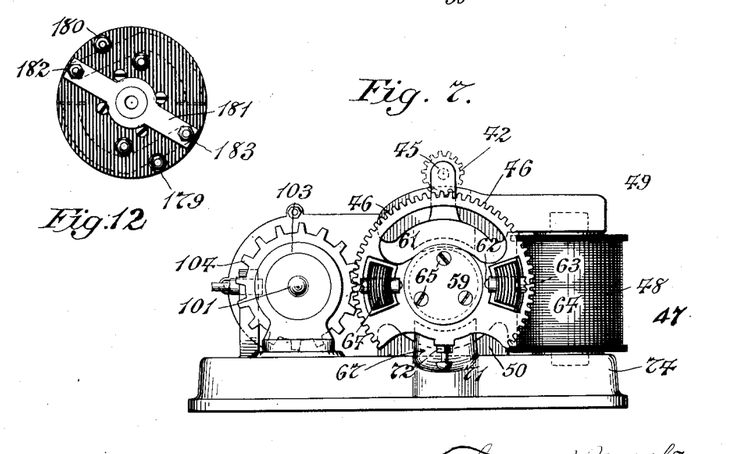
Fig. 7 is an end view of the mechanism shown in Fig. 6.
Figure 8:
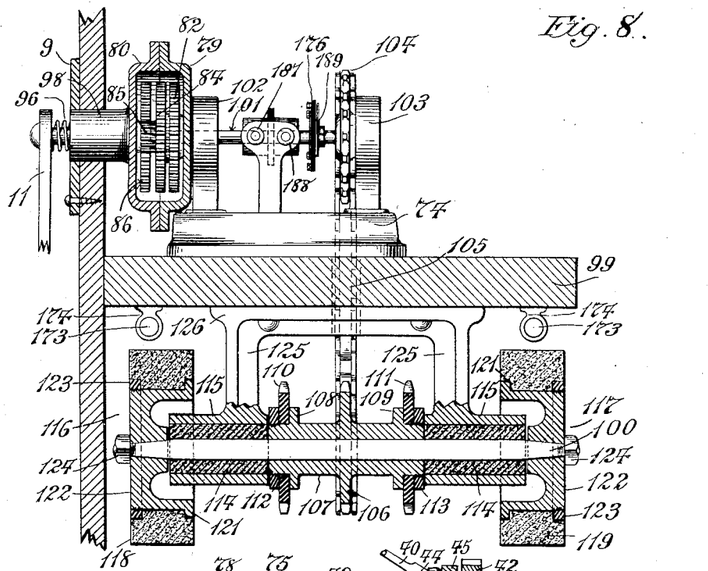
Figs. 8 and 9 are vertical sections taken on the lines 8—8 and 9—9 shown in Fig. 4.
Figures 9, 10:
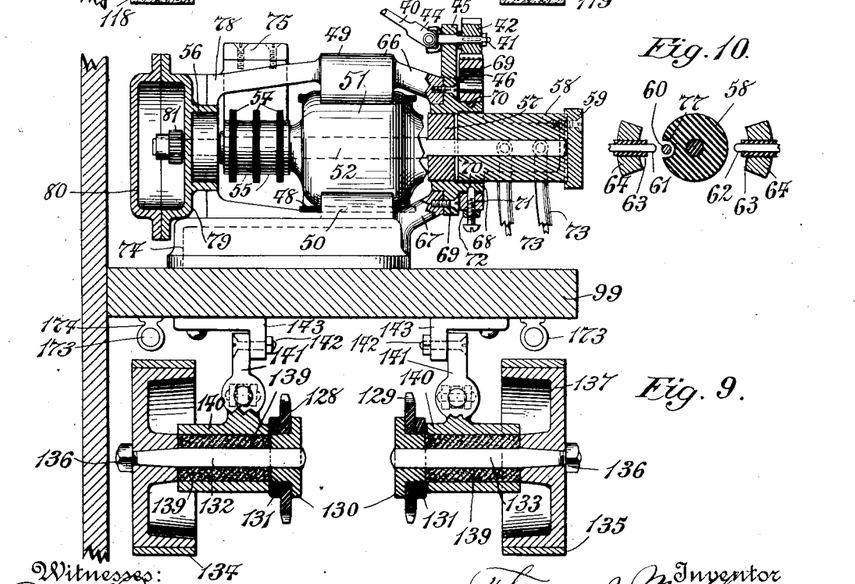
Fig. 10 shows a section of a detail.

I have shown and described a synchronous motor for controlling the circuits. The synchronous motor 47 shown in Figs. 6, 7, 8 and 9 has a field magnet 48 which may be a permanent or a permanent and electro-magnet. 49 and 50 are its poles. 51 is the armature supported on the shaft 52. 54 are insulating flanges located between contact rings 55 adapted to connect the armature with an external circuit. 56 57 are bearings in which the shaft 52 is supported. A part of the current to be rectified is directed to the armature which causes the armature to move in unison with its change. A cylinder 58, (Fig. 9) of insulating material is secured to the armature shaft by means of a cap 59. A rod 60 is mounted in the cylinder and is moved in proximity to metallic points or terminals 61 and 62 which are supported in insulating shells 63. They are in turn supported in the blocks 64 which are secured to the wheel 46. The wheel 46 is supported by the arms 66 and 67 and is movable on the shell or flange 68, secured to the arms 66 and 67 by the screws 69. 70 is a channel in which the screw 71 is secured by nut 72. The screw moves in the channel when the wheel 46 is turned. 73 are flexible insulated conductors connected to the terminals which permit movement of the wheel 46. The motor mechanism is located on the base 74. A right angular piece 75 (Figs. 6 and 9) secures the contacts 76 to the frame 78. The frame 78 is supported by the aluminum casing 79 and 80, the core of the magnet 48 and brass casting 45, nonmagnetic parts which prevent short circuit of the magnetic flux passing through the core of the coil 48. Any means may be used to bring the motor up to synchronism. The motor shown here is first brought to synchronism with the current by a crank. This is done by the chain of gears, 81, 82, 83, 84, 85, 86 which may be connected to the crank 11. The shaft 87 supports the cogs 82, 83, and 86 the cogs 82 having the side bearing 88 on the casing. The shaft 87 is secured by the nut 89. The cog 86 moves between the collar 90 and the casing, and on the end of the shaft 87. The cog 86 is provided with ratchet teeth 93. A corresponding ratchet plate 94 contained in the cylindrical pocket 98 is connected to the crank 11 which is pivoted in the head 95 and is pressed outward by the spring 96. The crank may be connected to the mechanism by mere pressure against the spring. Cog wheels 84 and 85 are connected to shaft 101. 85 is a follower to 86 and 83 is a follower to 84. 81 is a follower to 82 which is attached to 83. 81 is a pinion secured to the armature shaft. The crank thus drives the armature at a high speed. The shaft 101 has two bearings 102 and 103. (See Figs. 8 and 9). To one end of the shaft 101 is attached a gear wheel 104 of vulcanized material. A chain 105 passes over the gear wheel 104 and through holes located in the shelf 99. The chain 105 passes over a gear wheel 106. The gear wheel 106 is attached to a hollow shaft 107 which has collars 108 and 109. Gear wheels of fiber 110, 111 are secured in position on the cylinder 107 by means of the nuts 112 and 113. The whole is supported on the shaft 100 which is in turn supported in graphite bearings 114 contained in heads 115. Wheels 116, 117 are secured to the end of the shaft 100. The wheels 116, 117 consist of the carbon rings 118, 119 which are secured against collars 121 on castings 122 by means of the rings 123. The castings are secured by nuts 124. The wheels together with the gearing are supported by the hanger 125 and 126. Chains 127 pass over the gears 110 111 and mechanically connect them to the gears 128 and 129. The gears 128 and 129 are of fibrous material and are secured by the collars 130 and the nuts 131. They are mounted on the shafts 132 and 133. The shafts carry the wheels 134 and 135 which are secured by the nuts 136. The wheels consist of a collar or band of steel shrunk upon the castings 137. The shafts move in graphite bearings 139 located in the heads 140 which are supported by hangers 141 which are pivoted on the pins 142 and secured to the shelf 99 by means of brackets 143. The position of the wheels 134 and 135 may be shifted by means of the rods 145 (see Fig. 4) which are pivotally connected to the hangers. One end of each rod 145 is screw threaded and provided with thumb nuts 148 and 149 which are located on opposite sides of the yoke 150 to which is pivoted the threaded shell 151. The rods 145 and consequently the wheels are secured in position by means of the nuts 148 and 149, and yoke 150. There is one more cog on the gear wheels 128 and 129 than on the gear wheels 110 and 111 so that the opposing portions of the wheels 118 and 119 and 134 and 135 will not come into opposing relationship in two consecutive turns. They moreover rotate in opposite directions whereby opposing portions move outward together from between the wheels. The wheels 118 and 119, 134 and 135, constitute the electrodes between which the arcs are formed and maintained by the current which is to be rectified. They may be made of any suitable material. It has been found by experiments that the combination of carbon with steel produces best results, the carbon being the negative pole and the steel being the positive pole. A receptacle 155 is secured to the cross piece 156 which is secured to the standard 157. The receptacle contains a transformer which is peculiar to my invention. It has a cover 158 and insulators 159. Choke coils 160, 161 and 162 and condensers 163 and 164 are contained in the shell and supported preferably on the transformer. The transformer consists of the secondary spools 165, 165 and the primary spools 166, 166 supported on the laminated cores 167 which with the sides 168 complete the magnetic circuit when the primary circuit is closed. A laminated cross piece 169 is provided which shunts the flux when the primary is short circuited. This regulates the current in the primary, the self-induction of the primary being increased according to conductiveness of the parts between the terminals of the primary. Some of the lines will shunt across under normal working of the transformer but sufficient number of lines of force pass through the primary coil to operate it. This prevents any damage being done by reason of accidental short circuit of the primary. Frames 168 and 170 are secured to the top and bottom of the transformer. The transformer and the lower frame is supported on the blocks 171.

It has been found that sometimes when an arc is started across one pair of electrodes, that a current will also be established across the other pair of electrodes which may be due to a static discharge or to short circuiting of the high potential current through the secondary of transformer 203. So injurious is this current thus established that holes are sometimes eaten or burnt into the electrodes. This has been entirely obviated by connecting the terminals of exceedingly high resistances 173 to the electrodes. The resistances are mounted on the shelf 99 by standards 174. The impedance of coils 17 of the magnet 31 also operates to limit the improper sparking between the electrodes. The sparking across the electrodes short circuits the resistances. The resistances of the arcs thus produced is practically negligible as compared to the resistance of the rods so that they are practically cut out of the circuit. The high resistances practically prevent the flow of the current of the main circuit but when they are cut out of the circuit by the arc, the current flows in the circuit.

On the shaft 101 is located a switch which operates automatically to close the circuit. The switch comprises an insulating disk 176, as shown in Figs. 6, 8, 11, 12 and 13. On the disk is mounted two movable arms 177 and 178 which are limited in their movements by the pins 179 and 180. The arms are pivoted at 182 and 183. The pivot pins are connected together by the metallic strip 181 located on side of the disk opposite to that on which the arms are located. The stop pins 179 and 180 are connected to the collars 184 and 185 which are separated from each other by the insulated material 186. The collars are connected with the external circuits by means of the brushes 187 and 188. When the motor is started the shaft 101 is revolved by means of the crank 11 and causes the arms 178, 177 to fly outward and make connections with the contacts 180 and 179. When the armature moves synchronously with the current the arms continue to maintain this position until the motor ceases to rotate whereupon one of the arms drop down and the circuit is broken.

Figure 13:
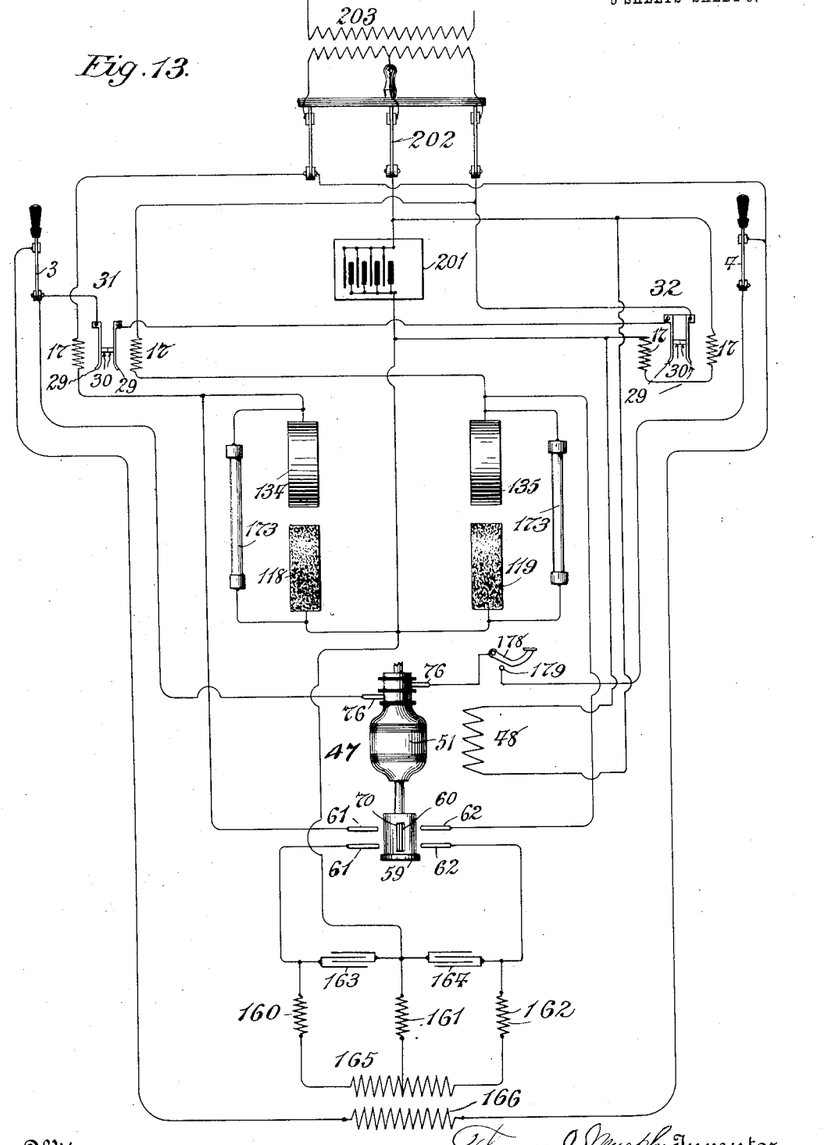
Fig. 13 is a diagram illustrating the connections between the parts of my invention.

Referring to the diagram shown in Fig. 13, 201 is a battery to be charged, for example, by means of the rectified current. Any translating device may be used, however. 203 is the source of current that is to be rectified. This is connected with the circuits and mechanisms embodying my invention. The following connections may be made which however may be greatly modified: The switch 202 is a three knife switch one being for the return wire, the outside knives being so connected to the coils 17—17 of the cut-out magnets 31 and 32 that the coils 17—17 of the switch 32 are in shunt with the battery. The magnets of switch 31 are connected to the steel electrodes 134 and 135, the circuit being completed through the electrodes 118 and 119 and return wire and any device that may be located therein. The electrodes 118, 119 are also connected directly to a source 165 of high potential current.

The armature 51 which moves in unison with the variations of the main line current, controls the teaser circuit that is a circuit having a source 165 of high potential current. The terminals on one side are completed by the conductor 60 so that the electrodes 134 receives a charge from the teaser circuit having the source 165 the instant that the conductor 60 passes the terminals 61 and in like manner electrode 135 is charged when the conductor 60 passes the terminals 62. The opposite side of the teaser circuit is connected with the electrodes 118, 119 so that the condensers 163, 164, charged by the high potential current, are discharged by the synchronously operating device across the electrodes on one side or the other, as the current changes sign and at certain points in each wave. Choke coils 160, 161 and 162 are connected to the secondary coil 165 for protecting the parts of the teaser circuit, and preventing a discharge or a reaction through the secondary 165.

The operation of the mechanism is as follows: When it is desired to rectify the current the switches 202, 3 and 4 are closed and at the same time the crank 11 is pushed in so that the disk 94 will engage with the teeth 93 and turn the armature. This will cause the armature to speed up until it moves synchronously with the alternations of the current which now passes through it by reason of closing the said switches and the automatic switch on the shaft 101. The motor will then maintain that speed. The terminals 61 and 62 located on the wheel 46 are then adjusted to the proper position by the operation of the knob 7. This position being such that the condensers 163 and 164 charged by the high potential teaser current will be discharged across the said terminals and conductors 60 and across the electrodes 134 and 118 on one hand and 134 and 119 on the other at such times when the potential of the alternations of the current or the variations thereof is at such point that it will maintain the arc once started by the high potential teaser current notwithstanding the counter-electromotive force either of the arc thus formed and of the storage battery or other device operated upon. The arc being formed and maintained by the main line current, it completes a circuit through the electrodes 134 and 118 to the battery 201 during one part of the wave while the arc between the electrodes 135 and 119 completes the circuit from the main line to the battery 201 during the other part of the wave but the current is directed to the battery or translating device at all times in the same direction, that is, it is rectified and at such a potential as will maintain its flow and so that all of the useful parts of the waves of the alternating current will be utilized. This renders the system exceedingly economical and efficient. The rotation of the electrodes causes the arc to discontinue immediately when the potential falls below that point wherein the arc may be normally sustained. It prevents the maintenance of the incandescent vapor or gas which cuts down the resistance, and is thus ruptured at the proper point and discharge of the battery 201 and other deleterious effects are obviated. The switch 32 operates to disconnect the motor when the potential of the battery rises to such a point that it will cause the magnets 17 to overcome the weighted armature 18 and open the contacts 30. If the charging current should become too large by some unexpected circumstance the cut-out 31 will operate, the coils 17 of the said cut-out being connected in series with the electrodes 134, 135 and with the battery 201.

The transformer 166 is connected through the one blade of the switch 202 to the line transformer 203 on one side and through the switch 3 and contacts 30 in switches 31 and 32 and through another blade of the switch 202 to the line transformer 203 whereby the circuit of the primary 166 is completed. The secondary 165 of the transformer is the source of the high potential current for charging the condensers 163 and 164 and producing the spark across the electrodes 118, 134 and 119, 135. The secondary 165 has a large number of turns whereby the potential produced between the terminals of the coil 166 is greatly magnified. A return is connected to the center of the coil 165 which is also connected to the electrodes 118 and 119. The circuit is completed through one of the pairs of electrodes on one side and one pair of terminals 61 and on the other side the circuit is completed through the other pair of electrodes and the other pair of terminals 62. Condensers 163 and 164 are connected to the return and to the terminals of the secondary 165. By this arrangement the condensers are charged by the secondary 165 and then at the proper time according to the adjustment of the position of the terminals 61 and 62, an oscillatory discharge of the condenser is produced between the electrodes, the instant the conductor 70 passes each pair of terminals.

The devices herein disclosed merely constitute embodiments of my invention. They may be varied by those skilled in the art and yet embody the spirit of the invention. Many forms of devices and constructions may be made which will accomplish the same end but which lie entirely in the scope of what I claim is my invention and is new.

What I claim is new and desire to secure by Letters Patent is as follows:

1. In a rectifier the combination of a source of alternating current, a plurality of pairs of electrodes, a high resistance connected in shunt with each pair of electrodes, a circuit having a source of high potential current, means for causing the said high potential current to pass across the said pairs of electrodes in succession.

2. In a rectifier the combination of a circuit having a source of alternating current, two pairs of electrodes connected with two branches of the said circuit, a return wire, a circuit having a high potental current, a high resistance connected in shunt with each pair of electrodes, means for causing the last named circuit to be completed alternately through the said pairs of electrodes synchroncusly with the current of the first named circuit.

3. In a rectifier the combination of a main circuit, and a subsidiary circuit having a source of a variable current, a high resistance body located in the main circuit, means for shunting and short circuiting the high resistance body synchronously with the changes of the current in the first named circuit.

4. In a rectifier the combination of a circuit, having a source of variable current, a high resistance body located in the said circuit, a pair of opposing electrodes connected to the terminals of the high resistance body, a translating device located in the circuit of the said electrodes, means for short circuiting the high resistance body across the electrodes periodically as the current in the said circuit changes.

5. In a rectifier the combination of a main circuit, a source of alternating current, a translating device, two resistance bodies connected in the said circuit, means for alternately cutting the said resistances out of the circuit as the current changes.

6. In a rectifier the combination of a main circuit, a source of alternating current, a translating device and two resistance bodies connected in the said circuit, a subsidiary circuit, means controlled by the current of the first named circuit and adapted to be connected in the second named circuit for cutting the resistances out of the circuit alternately.

7. In a rectifier the combination of a main circuit, a source of alternating current, a translating device, two resistance bodies connected in the said circuit, a pair of electrodes connected to the terminals of each resistance body, a subsidiary circuit, a means controlled by the current of the first named circuit and adapted to complete the second named circuit across the pairs of electrodes alternately and through the translating device.

8. In a rectifier the combination of a shaft, a pair of electrodes supported on the shaft, gear wheels of insulating material connected to the said shaft, a pair of electrodes, a pair of shafts for supporting the said electrodes connected to the said gear wheels.

9. In a rectifier the combination of a pair of shafts, electrodes supported on the said shafts, insulating gear wheels mounted on the said shafts, gear chains connected to the said gear wheels and means for causing the said chains to rotate the said gear wheels.

10. In an electric device the combination of electrodes, gear wheels composed of insulating material for causing the said electrodes to rotate, a motor, chains connected to the motor and the gear wheels, whereby the motor is insulated from the electrodes.

11. In a rectifier the combination of a pair of electrodes, a shaft for causing the said electrodes to rotate, a pair of shafts, a second pair of electrodes, one mounted on each of the last mentioned shafts, gear wheels composed of insulating material for causing the said electrodes to rotate, whereby the said electrodes are insulated from each other.

12. In an apparatus for rectifying currents of electricity the combination of a shaft, a pair of electrodes supported on the shaft, a cylinder supported on the shaft, insulating gear wheels connected to the said cylinder, annular nuts for securing the said gear wheels to the said cylinder.

13. In an electric device, the combination of a conductor, a plurality of pairs of terminals, means for causing the said conductor to rotate about the axis parallel to the conductor and in proximity to each pair of terminals and means rotatable about the axis for adjusting the said pairs of terminals with respect to the axis of the rotation of the conductor.

14. In a rectifier, the combination of a source of alternating current, a translating device, means for completing the circuit through the translating device periodically as the current alternates and an electric switch operated by the current passing through the said translating device for controlling the said means.

15. In an electric device the combination of two pairs of terminals, a conductor, a motor adapted to move the said conductor in unison with the current passing through its armature and in proximity to the said pairs of terminals, a wheel for supporting the said terminals, a means connected to the said wheel for varying the position of the said terminals around the said conductor and a means for locking the said wheel in its adjusted position.

16. In an apparatus for rectifying currents of electricity, the combination of a cylindrical block having a recess, a conductor supported in the said recess, a plurality of terminals, means for causing the said conductor to move in proximity to the said terminals.

17. In an apparatus for rectifying currents of electricity the combination of a shaft, an armature supported on the said shaft, an insulating cylindrical block supported on the said shaft, a rod supported in the said block, terminals, a wheel for supporting the said terminals, means for adjusting the said terminals, with respect to the said shaft.

18. In a rectifier the combination of a source of electric current, two pairs of electrodes, an overload cut-out controlled by the current passing through the said electrodes, a storage battery, an electric cut-out controlled by the current of the said storage battery and a synchronously operating device and a transformer connected to the said electrodes and controlled by the said cut outs.

19. In an apparatus for rectifying currents of electricity, the combination of a synchronous motor, an insulated conductor connected to the shaft of the said motor, a pair of terminals located in proximity to the path of rotation of the said conductor, a wheel insulated from and adapted to support the said terminals, a manual means for causing the rotation of the said wheel, a ratchet attached to the said manual means and an elastically operated means for securing the said ratchet in position.

In testimony whereof, I have signed my name to this specification, in the presence of two subscribing witnesses.

THOMAS J. MURPHY.

Witnesses:
 MARY B. DICKENS,
 JAS. P. B. DUFFY.